UNITED STATES PATENT OFFICE.

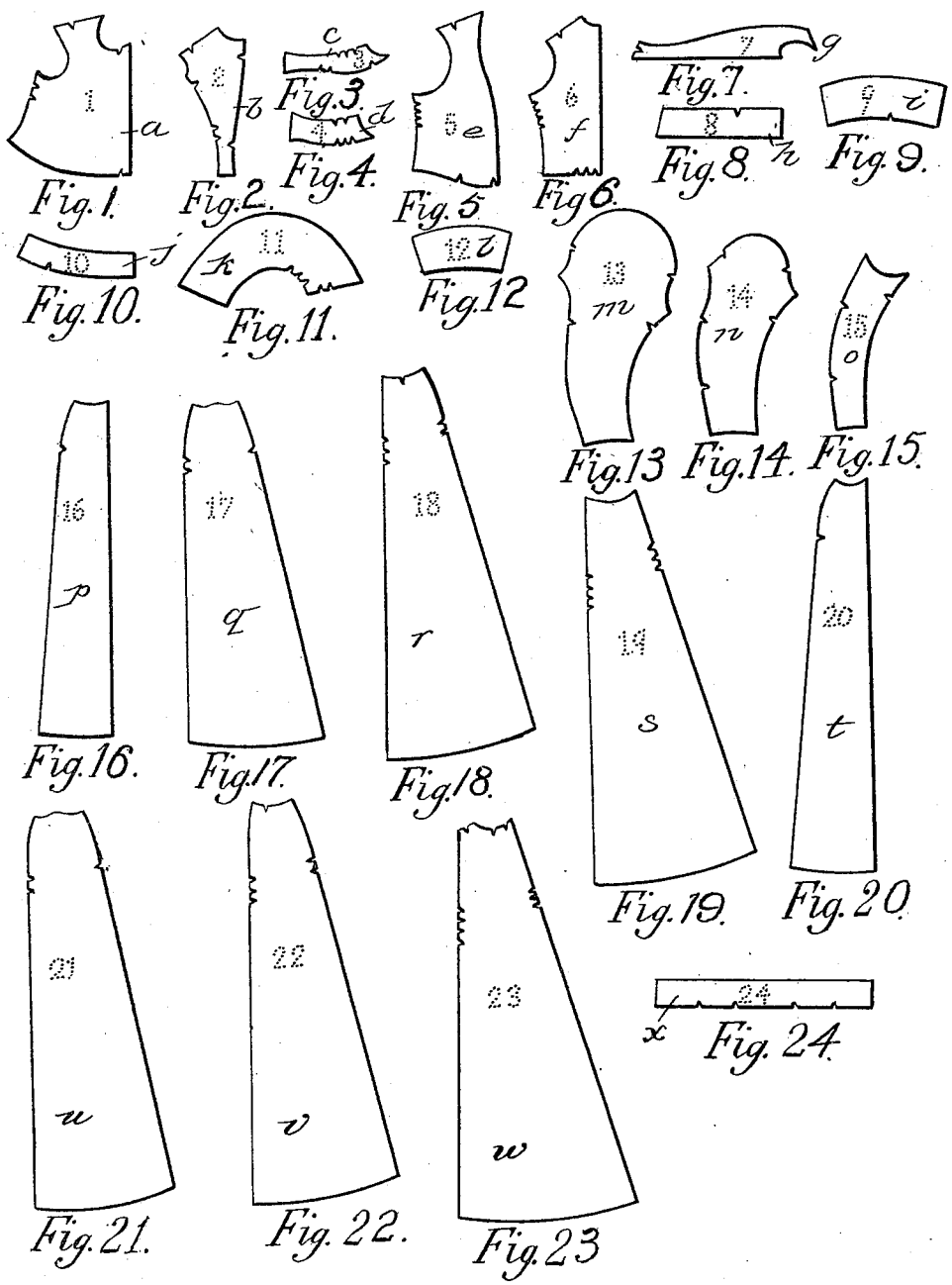

ROBERT S. O'LOUGHLIN, OF GLENS FALLS, NEW YORK.

PATTERN FOR GARMENTS.

SPECIFICATION forming part of Letters Patent No. 632,361, dated September 5, 1899.

Application filed April 5, 1898. Serial No. 676,604. (No model.)

*To all whom it may concern:*

Be it known that I, ROBERT S. O'LOUGHLIN, a citizen of the United States, and a resident of Glens Falls, in the county of Warren and State of New York, have invented certain new and useful Improvements in Patterns for Garments, of which the following is a full, clear, and exact description and specification.

My invention relates to improvements in patterns for garments; and it consists in the novel construction of pattern hereinafter described and claimed.

My invention has for its object the convenient, rapid, and accurate identification of the respective parts of the pattern, the avoidance of errors and confusion peculiar or incident to the system of manufacturing and using patterns for garments heretofore in vogue, and the facilitating of a rapid and accurate cutting of material to be used in making garments, and the proper, rapid, and accurate joining and adjustment of the respective parts thereof in the construction of garments, all of which will be set forth more fully hereinafter.

In the accompanying drawings I have shown by way of example one form of pattern embodying my invention. It is understood, however, that other forms and characters of patterns are equally within my invention.

The pattern may be made of paper, fabric, or other material, but is most generally and preferably made of paper. It is usually accompanied by a printed instrument, which usually contains one or more views of the garment which corresponds with the pattern, a statement of the measurement or measurements of the person for whom or the form for which the pattern is adapted, and a statement of the quantity or quantities of material or materials required to make the garment according to the measurements designated. It also contains printed instructions for producing the garment. The drawings represent a group containing illustrations in outline of the several separate pieces or portions of a pattern which are used as a model or guide in cutting the material requisite for making the garment and joining together the respective pieces and properly constructing, fitting, and adjusting the garment.

Heretofore the custom has been to endeavor to identify the separate portions of the patterns by designating each separate piece by a technical name. Unless such portions are accurately identified it is impossible to properly construct the garment. Hitherto on account of the difficulty and uncertainty of identification much confusion has been occasioned, considerable delay experienced, and great quantities of material damaged or destroyed. The difficulty of identifying each particular part by means of its technical name is apparent. Each separate piece, in most instances, contains one or more indentations commonly known as "notches." These have been used in the past to assist in giving comprehensible instructions as to the proper joining of the several pieces. Owing to the similarity in appearance of many of the respective parts of a given pattern and of the necessity of placing the same number of notches in several different portions of the same pattern great confusion has arisen in the past and great inconvenience and trouble has been caused through inability to distinguish accurately the different parts of a pattern by means of its technical name or of the number of notches indented therein for the purpose of showing the places of joining. My invention makes impossible any confusion or difficulty in identifying the respective parts of the pattern or of properly joining the same together. This will appear more fully by a reference to the drawings.

In the drawings, Figure 1, which represents the front of the pattern, is distinguished or identified by the mark or symbol represented by the numeral "1." This mark or symbol may consist of a letter, number, arbitrary sign, or other character, or of a combination of words, letters, numerals, arbitrary signs, or other characters. I prefer and have used serial numbers for the purpose of illustrating my invention. These marks or symbols are formed in the respective portions of the pattern by perforating the material of the pattern. Fig. 2 represents the back, which is perforated with the numeral "2." Fig. 3 represents the side back, which is perforated with the numeral "3." Fig. 4 represents the under arm gore, which is shown as perforated with the numeral "4." Fig. 5 represents the full front, which is perforated with the numeral "5." Fig. 6 represents full back, which is perforated with the numeral "6." Fig. 7 represents the vest, which is perforated with the numeral "7." Fig. 8 represents the belt, which is perforated with the numeral "8." Fig. 9 represents the stock, which is perforated with the numeral "9." Fig. 10 represents the collar, which is perforated with the numeral "10." Fig. 11 represents the peplum, which is perforated with the numeral "11." Fig. 12 represents the cuff, which is perforated with the numeral "12." Fig. 13 represents the upper sleeve portion, which is perforated with the numeral "13." Fig. 14 represents the upper-sleeve-portion lining, which is perforated with the numeral "14." Fig. 15 represents under sleeve portion, which is perforated with the numeral "15." Fig. 16 represents the front gore, which is perforated with the numeral "16." Fig. 17 represents the first side gore, which is perforated with the numeral "17." Fig. 18 represents the second side gore, which is perforated with the numeral "18." Fig. 19 represents the back gore, which is perforated with the numeral "19." Fig. 20 represents the front gore, which is perforated with the numeral "20." Fig. 21 represents the first side gore, which is perforated with the numeral "21." Fig. 22 represents the second side gore, which is perforated with the numeral "22." Fig. 23 represents the back gore, which is perforated with the numeral "23." Fig. 24 represents the belt for the skirt, which is perforated with the numeral "24."

In the figures the sheets constituting the pattern parts are lettered $a$ to $x$, inclusive, and each is shown as provided with a numeral perforated therein, the said numerals running serially from "1" to "24," inclusive. By the use of the perforated marks and symbols and of the combination of the same with the parts or whole of the pattern in the description and instructions given for producing the garment the identification of each separate portion of the pattern is rendered certain and absolute, the instructions rendered incapable of misconstruction, and the convenient, rapid, and accurate production of the garment assured. The confusion and error arising out of and peculiar and incident to the use of patterns in making garments, as heretofore practiced, more particularly when used by persons unfamiliar with technical terms or unskilled in the art of cutting, fitting, and adjusting, are thus rendered impossible, and a scientific, accurate, and simple method of imparting instructions in the art of cutting, fitting, adjusting, and constructing garments is thus established. The value of patterns as models or guides for the construction of garments is considerably enhanced, and my invention is designed and intended to encourage and facilitate the practice of domestic art, handicraft, and economy.

It will be further observed that owing to the perforated designations in the parts of the pattern the pieces of fabric which are cut out to conform to the said pattern may be readily marked with the same numbers or designations as are borne by the parts of the pattern—that is to say, a piece of chalk may be rubbed over the portion of the pattern bearing the distinguishing designation or number, and the fabric will be marked thereby by reason of the fact that the chalk will reach the surface of the fabric through the perforations in the pattern. It will thus be seen that the perforations in the pattern not only provide means for distinguishing the different parts of the pattern from each other and have cross-reference to the label upon which the directions are borne, but also constitute a means whereby the sections of fabric cut out in accordance with the pattern may be appropriately marked and their proper grouping in the garment rendered certain.

Having described my invention, what I claim, and desire to secure by Letters Patent, is—

1. As a new article of manufacture, a pattern for garments comprising a series of sheets representing different parts of a garment capable of being assembled together in a definite manner into a garment, each of the said sheets being provided with a different designating character, device or symbol constituted by perforations in the body of the said sheets the said characters, &c., constituting a definite series, whereby designations of the pattern may be readily transferred to the garment material to which the pattern is applied, so that the material itself, when cut to the pattern may be assembled into a garment with certainty.

2. The herein-described pattern for garments, comprising a series of sheets, each sheet having a different serial number perforated therein, so that the fabric cut from the said pattern may be appropriately marked with the serial numbers by chalking the pattern at the parts thereof where the numbers are applied, whereby reference may be made directly upon the fabric cut out to a schedule or chart of instructions referring to the numerals of the pattern.

Signed in the city, county, and State of New York this 23d day of March, 1898.

ROBERT S. O'LOUGHLIN.

Witnesses:
BEN FRANKLIN WILDER,
ALFRED P. SCHOEN.